G. WALTHER.
AUTOMOBILE TRUCK WHEEL.
APPLICATION FILED MAY 26, 1913.
1,120,256.
Patented Dec. 8, 1914.
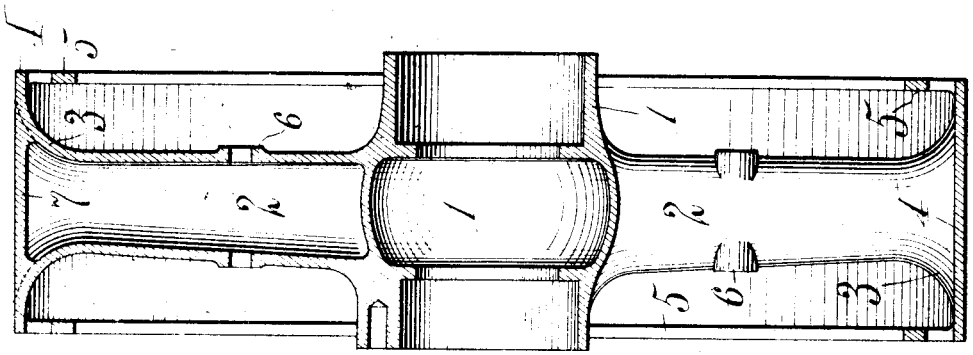
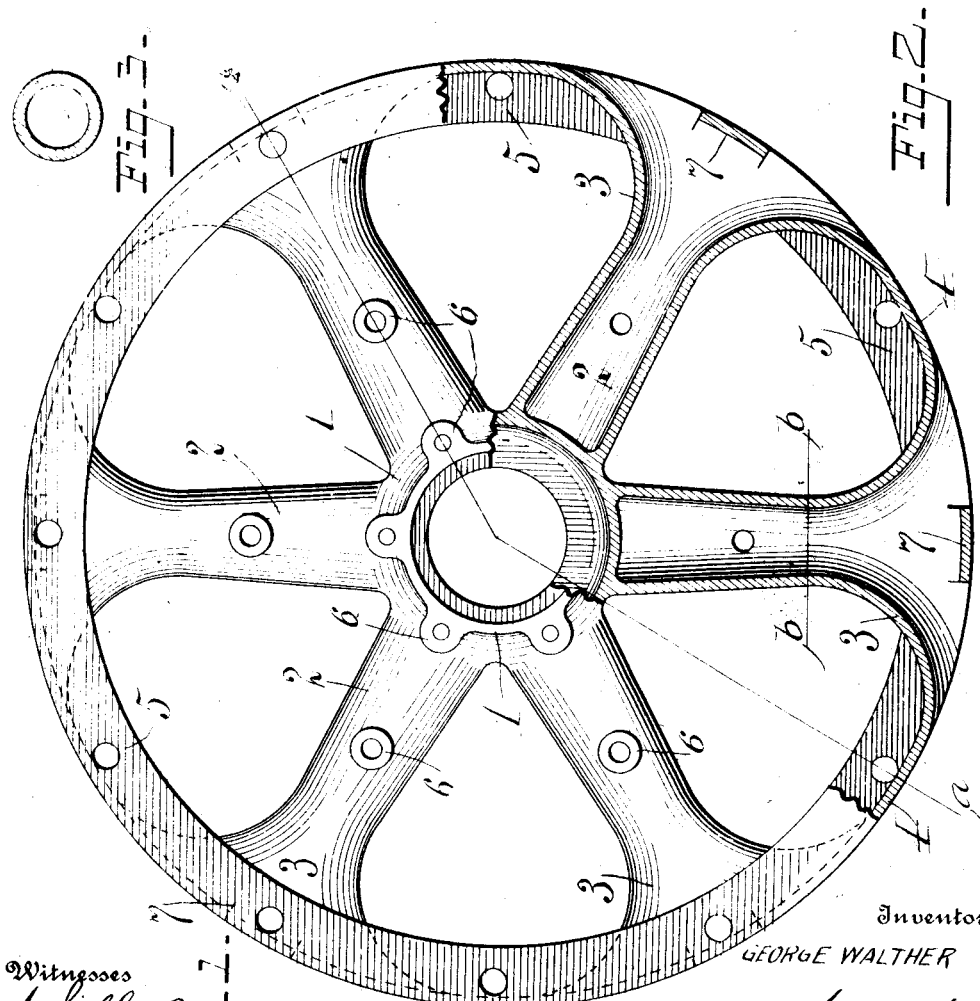
Witnesses
M. Subler
M. Galloway
Inventor
GEORGE WALTHER
By R. J. McCarty
his Attorney

UNITED STATES PATENT OFFICE.

GEORGE WALTHER, OF DAYTON, OHIO.

AUTOMOBILE TRUCK-WHEEL.

1,120,256. Specification of Letters Patent. Patented Dec. 2, 1914.

Application filed May 26, 1913. Serial No. 769,803.

*To all whom it may concern:*

Be it known that I, GEORGE WALTHER, a citizen of the United States, residing at Dayton, in the county of Montgomery and State of Ohio, have invented certain new and useful Improvements in Automobile Truck-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a new article of manufacture, comprising an automobile truck wheel.

The object of said invention is to provide an automobile truck wheel of cast steel of minimum weight and maximum strength, for example, a wheel the metal of which is capable of exerting a maximum uniform strength at all points of the structure without increasing the weight thereof. In the structure, the spokes are hollow and extend in broad curves which terminate in the rim. All the crystals of the metal lie at right angles with or radial to the inner and outer surfaces of the casing. Therefore, the crystals do not at any point meet at an angle, thus avoiding any weak points in the structure.

In the accompanying drawings, Figure 1 is an elevation of an automobile truck wheel made in accordance with my invention, and portions of which appear in section; Fig. 2 is a sectional elevation on line *a—a* of Fig. 1; and Fig. 3 is a cross section on the line *b—b* of Fig. 1.

The wheel thus illustrated is essentially cast in one integral member from steel. When so made, it consists of a hub 1 with tubular spokes 2 radiating therefrom. These spokes flare at 3, and extend in an annular channel rim 4 the margins 5 of which extend inwardly. The flaring of the spokes begin approximately two-thirds the length of said spokes from the hub and extends in sweeping curves into the rim. The channel rim serves to make strong the periphery of the wheel and to give it the necessary resiliency and to provide flanges which are suitably apertured to receive tire-attaching means. The outer ends 3 of the spokes 2 may be provided with integral braces 7 which substantially conform to the contour of the rim. By this means the wheel is strengthened at such points. The tubular spokes 2 and the hub 1 are provided with apertured bosses 6 for the attachment for the usual sprocket and brake drum (not shown).

It is well known, to the science of metallurgy, that cast metal, upon cooling, arranges the crystals thereof at right angles or radial to the contour of the casing. Owing to this inherent characteristic of such metal, where right angle joints or connections are formed, there is a decrease in the efficiency of the metal due thereto. Where the crystals are formed regularly or lie in the same direction, for example, where the spoke is continuous with the channel rim through curves, such decrease in the efficiency of the metal is obviated. From the drawings, it will be seen, that all portions of the wheel where strength is desired as well as lightness, for example the hubs, spokes and rim, the crystals of the metal lie at right angles or radial with the contour of the casting, and all connecting points, where the crystals may meet at their ends, are eliminated. All of the crystals are, therefore, joined along their sides which provides for the greatest strength. The metal of the spokes and the outwardly flaring extensions thereof, which run into and form the rim of the wheel, as well as the rim of the wheel, are substantially the same in thickness throughout the running length. This will be observed from Fig. 1 of the drawings. The construction is one of lightness as well as tenacity.

I claim as my invention:

A new article of manufacture, comprising a metal wheel the hub, spokes and rim of which are integrally united, the ends of the spokes being extended in broadly sweeping curves to form the rim, and the said rim being open opposite the spokes to the points where the curvatures of the spokes form said rim, whereby the formation of joints between the spokes and the rim is eliminated, substantially as specified.

In testimony whereof I affix my signature, in presence of two witnesses.

GEORGE WALTHER.

Witnesses:
 MELLIE GALLOWAY,
 MATHEW SEIBLER.